US011050792B2

(12) United States Patent
Venkatasubramanian

(10) Patent No.: US 11,050,792 B2
(45) Date of Patent: Jun. 29, 2021

(54) DYNAMIC DNS POLICY ENFORCEMENT BASED ON ENDPOINT SECURITY POSTURE

(71) Applicant: Cisco Technology, Inc., San Jose, CA (US)

(72) Inventor: Premkrishnan Venkatasubramanian, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 173 days.

(21) Appl. No.: 16/027,921

(22) Filed: Jul. 5, 2018

(65) Prior Publication Data

US 2020/0014724 A1 Jan. 9, 2020

(51) Int. Cl.
*H04L 29/06* (2006.01)
*H04L 29/12* (2006.01)

(52) U.S. Cl.
CPC .......... *H04L 63/20* (2013.01); *H04L 61/1511* (2013.01); *H04L 61/2007* (2013.01); *H04L 63/0281* (2013.01)

(58) Field of Classification Search
CPC . H04L 63/20; H04L 61/1511; H04L 61/2007; H04L 63/0281
USPC .......................................................... 726/1
See application file for complete search history.

(56) References Cited

U.S. PATENT DOCUMENTS

| 8,447,856 | B2 |  | 5/2013 | Drako |  |
|---|---|---|---|---|---|
| 8,633,598 | B1 | * | 1/2014 | St. Amand | .......... H01L 23/3121 257/778 |
| 9,294,498 | B1 | * | 3/2016 | Yampolskiy | ............ G06F 21/56 |
| 9,729,565 | B2 | * | 8/2017 | Reddy | ................. H04L 63/1425 |
| 9,736,185 | B1 | * | 8/2017 | Belamaric | ........... H04L 61/1511 |
| 9,756,047 | B1 |  | 9/2017 | Batchu et al. |  |
| 9,923,918 | B2 |  | 3/2018 | Nicodemus et al. |  |
| 9,979,588 | B1 | * | 5/2018 | Benson | ................. H04L 61/106 |
| 10,757,139 | B1 | * | 8/2020 | Cignetti | ................. H04L 63/10 |
| 2007/0143851 | A1 | * | 6/2007 | Nicodemus | ........... H04L 63/105 726/25 |
| 2009/0157889 | A1 | * | 6/2009 | Treuhaft | ................. H04L 69/22 709/230 |

(Continued)

OTHER PUBLICATIONS

Implement Domain Name System (DNS) on network simulator-3: Implement RFC 1035 on ns-3 Janaka Wijekoon, Hiroaki Nishi SIMUTOOLS'16: Proceedings of the 9th EAI International Conference on Simulation Tools and Techniques, pp. 56-65 (Year: 2016).*

(Continued)

*Primary Examiner* — Samson B Lemma
*Assistant Examiner* — Mohammad S Shams
(74) *Attorney, Agent, or Firm* — Edell, Shapiro & Finnan, LLC

(57) ABSTRACT

A method performed by an endpoint connected to a network. The method includes computing a security score for the endpoint and providing the security score and a requested domain name to a domain name service (DNS) resolver using a DNS request. The endpoint obtains a DNS response including an Internet Protocol (IP) address resolved by the DNS resolver based on the security score and the requested domain name. The endpoint then accesses the IP address obtained from the DNS resolver.

20 Claims, 10 Drawing Sheets

(56) References Cited

U.S. PATENT DOCUMENTS

| | | | |
|---|---|---|---|
| 2011/0213869 A1* | 9/2011 | Korsunsky | H04L 63/1483 709/223 |
| 2015/0180892 A1* | 6/2015 | Balderas | H04L 61/1511 726/11 |
| 2016/0080395 A1* | 3/2016 | Reddy | H04L 63/0236 726/23 |
| 2016/0119282 A1* | 4/2016 | Bladel | G06Q 30/0609 709/203 |
| 2016/0308898 A1* | 10/2016 | Teeple | H04L 63/1441 |
| 2016/0366176 A1 | 12/2016 | Bennison | |
| 2017/0310709 A1* | 10/2017 | Foxhoven | H04L 61/1511 |
| 2017/0331788 A1* | 11/2017 | Lemon | G06F 16/90335 |
| 2017/0359306 A1* | 12/2017 | Thomas | H04L 63/145 |
| 2018/0091540 A1 | 3/2018 | Solow et al. | |
| 2018/0097835 A1* | 4/2018 | McGrew | H04L 61/1511 |
| 2019/0052650 A1* | 2/2019 | Hu | G06F 21/552 |
| 2019/0103993 A1* | 4/2019 | Cidon | H04L 61/6068 |
| 2019/0236661 A1* | 8/2019 | Hogg | H04L 63/1433 |

OTHER PUBLICATIONS

PSI: Precise Security Instrumentation for Enterprise Networks Tianlong Yu, Seyed K. Fayaz, Michael Collins, Vyas Sekar, Srinivasan Seshan, Carnegie Mellon University, RedJack. pp. 1-15 (Year: 2017).*

Microsoft Docs, "Use DNS Policy for Intelligent DNS Responses Based on the Time of Day", https://docs.microsoft.com/en-us/windows-server/networking/dns/deploy/dns-tod-intelligent, Mar. 23, 2018, 6 pages.

White Paper, "The New Standard in DNS Security, Understanding Threats and Using a Comprehensive Approach for Securing DNS", Infoblox, Inc., WP-0202-00 1606, downloaded from the internet on Jul. 3, 2018, 9 pages.

Microsoft Docs, "Use DNS Policy for Geo-Location Based Traffic Management with Primary Servers", https://docs.microsoft.com/en-us/windows-servernetworking/dns/deploy/primary-geo-location, Mar. 23, 2018, 7 pages.

\* cited by examiner

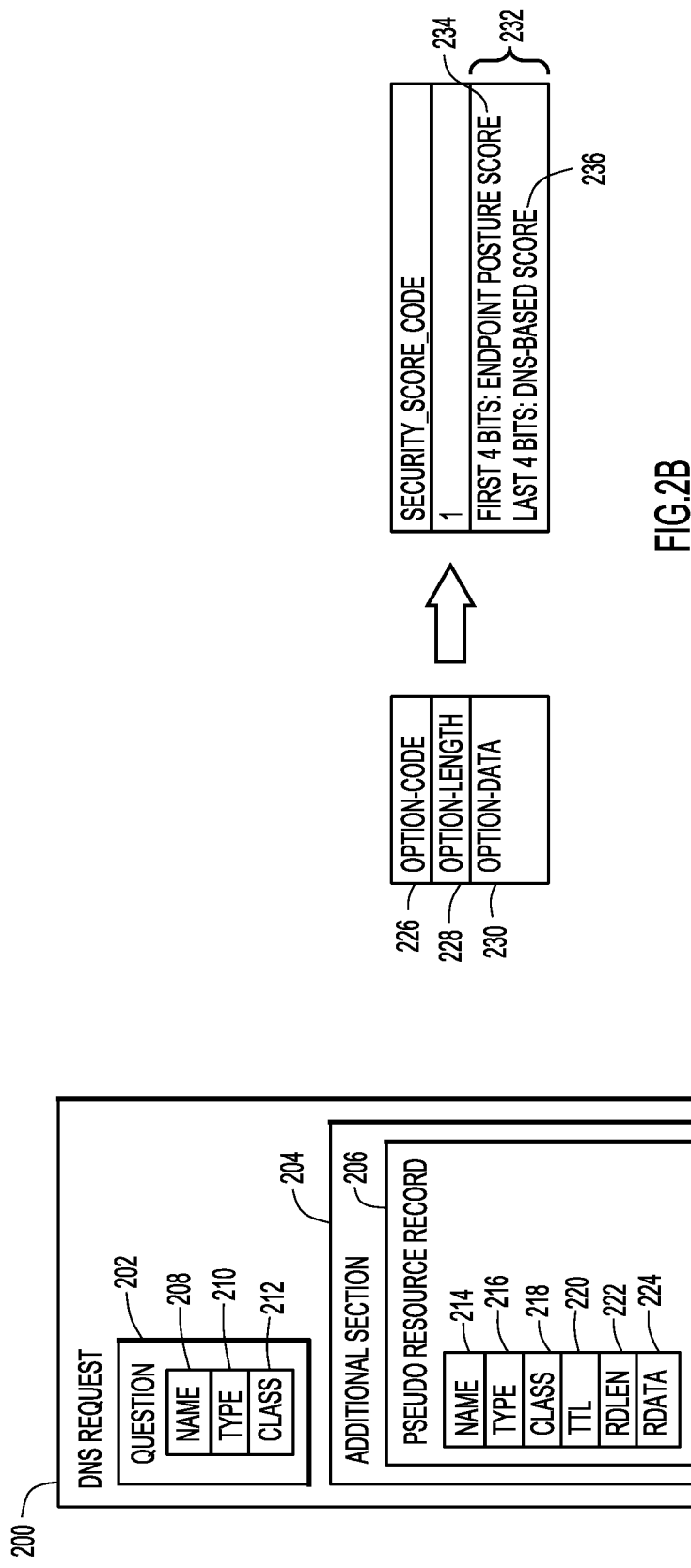

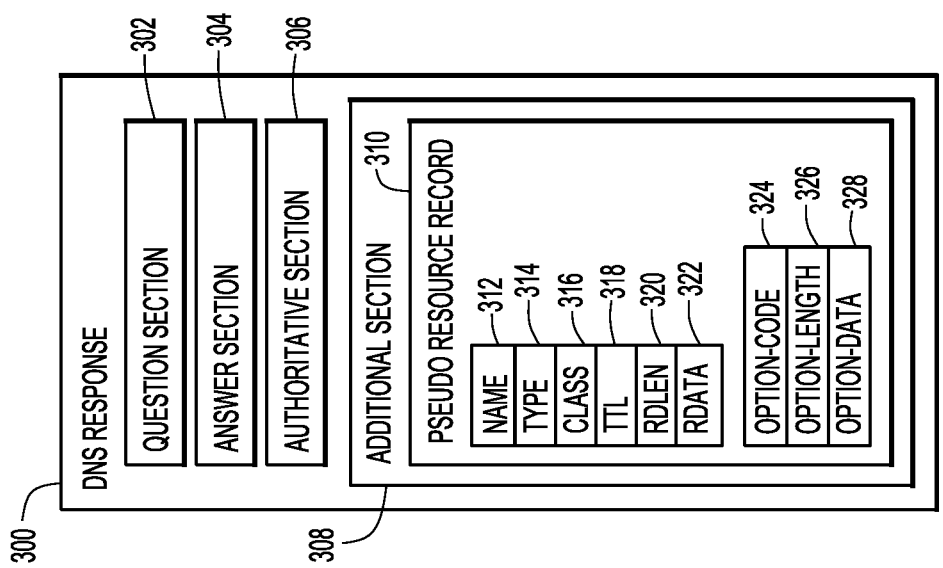
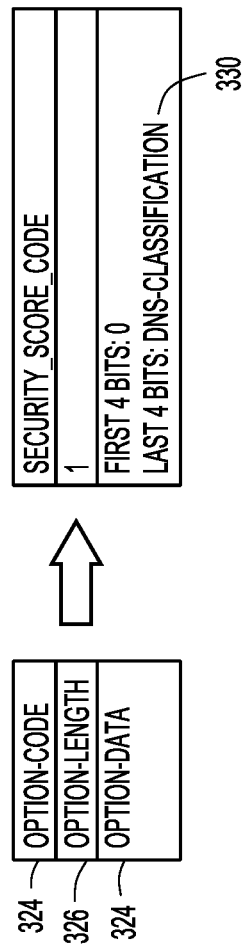
FIG.3B
FIG.3A

| DOMAIN NAME CLASSIFICATION | DOMAIN NAME RESOLUTION (NO ANALYSIS OF SECURITY SCORE) | DOMAIN NAME RESOLUTION WHEN ENDPOINT SECURITY SCORE IS SAFE | DOMAIN NAME RESOLUTION WHEN ENDPOINT SECURITY SCORE IS AVERAGE | DOMAIN NAME RESOLUTION WHEN ENDPOINT SECURITY SCORE IS POOR | DNS-CLASSIFICATION |
|---|---|---|---|---|---|
| SAFE | ORIGINAL IP | ORIGINAL IP | PROXY IP | PROXY IP | 0 |
| UNKNOWN / NEWLY SEEN | ORIGINAL IP | ORIGINAL IP | PROXY IP | BLOCK PAGE IP | 1 |
| SUSPICIOUS | PROXY IP | PROXY IP | BLOCK PAGE IP | BLOCK PAGE IP | 2 |
| UNSAFE | BLOCK PAGE IP | BLOCK PAGE IP | BLOCK PAGE IP | BLOCK PAGE IP | 3 |

FIG. 8

DYNAMIC DNS POLICY ENFORCEMENT BASED ON ENDPOINT SECURITY POSTURE

TECHNICAL FIELD

The present disclosure relates to enforcing Domain Name System (DNS) policies.

BACKGROUND

The DNS is a decentralized naming system for computers, services, or other resources connected to the Internet or a private network. One function of the DNS is to resolve domain names to Internet Protocol (IP) addresses using a DNS resolver. DNS resolvers may implement DNS-based security policies by resolving domain names to IP addresses based on a classification of the requested domain name. The DNS-based security policies block domains based on the content hosted by the requested domain name rather than for security reasons. For example, a DNS resolver may resolve a requested domain name to the IP address of the requested domain name when the requested domain name has a safe classification. Additionally, a DNS resolver may resolve a requested domain name to a blocked page IP address when the requested domain name has a malicious classification. Finally, a DNS resolver may resolve a requested domain name to a proxy server when the requested domain name has a risky classification.

BRIEF DESCRIPTION OF THE DRAWINGS

FIGS. 2A and 2B depict a DNS request including an option for a security score of the requesting endpoint, according to an example embodiment.

FIGS. 3A and 3B depict a DNS response including an option for a domain name classification, according to an example embodiment.

FIG. 8 is a table showing domain name resolutions based on a domain name classification and an endpoint security score, according to an example embodiment.

DESCRIPTION OF EXAMPLE EMBODIMENTS

Overview

Techniques are presented for enforcing DNS security policies based on a security posture of a requesting endpoint. The requesting endpoint may execute an endpoint security scoring process that computes a security score for the requesting endpoint. The security score may include an endpoint posture score and a DNS-based score. The endpoint posture score may be based on software vulnerabilities of the requesting endpoint and the DNS-based score may be based on previously received DNS responses. The requesting endpoint may provide to a DNS resolver a DNS request that includes both the security score and a requested domain name. The requesting endpoint may then obtain, from the DNS resolver, a DNS response with a resolved IP address. Depending on the security score of the requesting endpoint, the resolved IP address may be the IP address of the requested domain name, the IP address for a proxy server, or the IP address of a blocked page. The requesting endpoint may then access the provided IP address.

Example Embodiments

Figure 1:
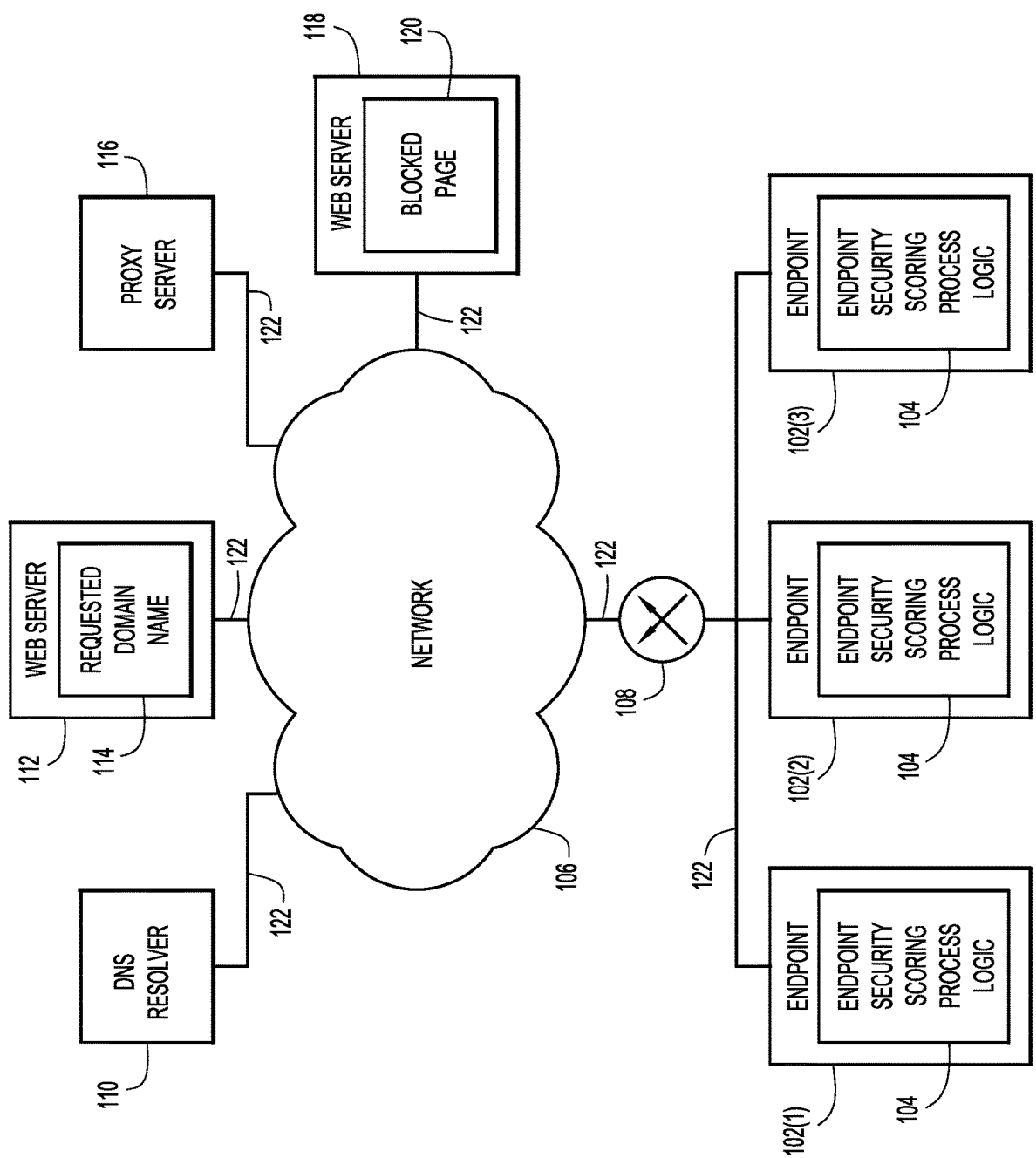
FIG. 1 is a block diagram of a computer network system/environment implementing a dynamic DNS policy based on a security posture of a requesting endpoint, according to an example embodiment.

With reference made to FIG. 1, shown is a block diagram of a computer network system/environment 100 that uses a dynamic DNS policy based on a security posture of a requesting endpoint, according to an example embodiment. The computer network system/environment 100 may include a plurality of endpoints 102(1)-102(3). While three endpoints 102(1)-102(3) are shown in FIG. 1, any number of endpoints may be present. Each of the endpoints 102(1)-102(3) may include endpoint security scoring process logic 104 that performs an endpoint scoring process, as will be described in further detail herein. The endpoints 102(1)-102(3) may be connected to a network 106 via a switch 108 or other type of network device.

There is a DNS resolver 110 that is connected to the network 106. Additionally, a first web server 112 may host a requested domain name 114. The first web server 112 may also be connected to the network 106. Moreover, a proxy server 116 may be connected to the network 106 as well. A second web server 118 may host/serve a security blocked page 120 that displays a notification to an endpoint user that the page/content requested by the endpoint has been blocked for security reasons. The second web server 118 may be connected to the network 106. While FIG. 1 depicts the blocked page 120 being hosted by the second web server 118, in other embodiments, the blocked page 120 and the requested domain name 114 may be hosted on a single web server, such as first web server 112. The endpoints 102(1)-102(3), switch 108, DNS resolver 110, the first web server 112, the proxy server 116, and the second web server 118 may communicate with the network 106 using one or more communication links 122. The communication links 122 may be wired, wireless, or a combination of wired and wireless.

Reference is now made to FIGS. 2A and 2B, with continued reference to FIG. 1. When a user of one of the plurality of endpoints 102(1)-102(3), such as endpoint 102(1), wishes to access an Internet resource, such as a web page, the user may request the domain name of the web page in, for example, a web browser. The requesting endpoint 102(1) may transmit a DNS request 200 (shown in FIG. 2A) to the DNS resolver 110.

The DNS request 200 may include a question section 202 and an additional section 204, which may further include a pseudo resource record section 206. The question section 202 may include a name field 208, a type field 210, and a class field 212. The name field 208 may include the domain name the user requested, such as www.company.com. The type field 210 may indicate the record type. For example, an "A" type may be used to translate the requested domain name to an IP address of the requested domain name. The class field 212 may indicate an independent name space with different delegations of DNS zones. For example, an "IN" class may be set for DNS records involving Internet hostnames, servers, or IP addresses.

The pseudo resource record 206 is part of the Extension Mechanisms for DNS (EDNS0) specification as described in RFC 2671, which is incorporated by reference herein in its entirety. The ENDS0 specification provides that the pseudo resource record 206 may have the following fields: a name field 214, a type field 216, a class field 218, a time to live (TTL) field 220, a resource data length (RDLEN) field 222, and a resource data (RDATA) field 224. The name field 214, like name field 208, may indicate the requested domain name. The type field 216 may indicate that the section is a pseudo resource record 206 of the additional section 204. The class field 218 may indicate a User Datagram Protocol (UDP) payload size of a sender, such as endpoint 102(1) of the DNS request 200. The TTL field 220 may indicate a length of time for which the DNS request 200 is valid. The RDLEN field 222 may describe the data in the RDATA field 224. The RDATA field 224 may include one or more {attribute, value} pairs.

For example, the RDATA field 224 may include an option-code field 226, an option-length field 228, and an option-data field 230. The option-code field 226 may be assigned by the Internet Assigned Numbers Authority (IANA). The option-length field 228 may indicate a size of the option-data field 230 in bytes. The option-data field 230 may include data that is interpreted based on the option-code field 226.

The DNS request 200 may include an option including a security score 232 (shown in FIG. 2B) for the requesting endpoint 102(1), as described in more detail herein. The security score 232 may be generated by the endpoint security scoring process logic 104. The DNS resolver 110 may analyze the security score 232 for the requesting endpoint 102(1) to determine which IP address the DNS resolver 110 should resolve the DNS request 200. Based on the security score 232 and, a classification of the requested domain name, the DNS resolver 110 may resolve the DNS request 200 to the IP address of the first web server 112 hosting the requested domain name 114, a proxy server 116, or the second web server 118 hosting the blocked page 120. The DNS resolver 110 may then return the resolved IP address to the requesting endpoint 102(1) in a DNS response. In this manner, the DNS requests are resolved based on a security posture of the endpoint 102(1) rather than a user identity of a user of the requesting endpoint 102(1) or an IP address of the requesting endpoint 102(1).

Referring now specifically to FIG. 2B, shown are data that may be included within the option-code field 226, the option-length field 228, and the option-data field 230 in the pseudo resource record 206 of the DNS request 200, according to an example embodiment. For example, the option-code 226 for the dynamic DNS security policy enforcement based on the endpoint security posture may be "SECURITY_SCORE_CODE". In one embodiment, the option-length field 228 may be one byte. The option-data field 230 may include the security score 232 for the requesting endpoint 102(1). The security score 232 may be composed of two scores: an endpoint posture score (component) 234 and a DNS-based score (component) 236. For example, when the option-code field 226 is "SECURITY_SCORE_CODE" and the option-length field 228 is one byte, the first four bits of the option-data field 230 may be the endpoint posture score 234 and the second four bits may be the DNS-based score 236, both of which are described in more detail herein.

Reference is now made to FIGS. 3A and 3B, with continued reference to FIGS. 1, 2A, and 2B. When the DNS request 200 includes the pseudo resource record section 206, the EDNS0 protocol requires that a DNS response also includes a pseudo resource record section. For example, the DNS resolver 110 may provide a resolved IP address for a requested domain name 114 to the requesting endpoint 102(1) with DNS response 300. DNS response 300 may include a question section 302, an answer section 304, an authoritative section 306, and an additional section 308, which may include a pseudo resource record 310. The question section 302 may correspond to the question section 202 described above in connection with FIG. 2A. The answer section 304 may include an answer to the DNS request 200, such as an IP address of the requested domain name 114. The authoritative section 306 may point to an authoritative name server.

The pseudo resource record 310 may include a name field 312, a type field 314, a class field 316, a TTL field 318, an RDLEN field 320, and an RDATA field 322. The name field 312, the type field 314, the class field 316, the TTL field 318, and the RDLEN field 320 may correspond to the name field 214, the type field 216, the class field 218, the TTL field 220, and the RDLEN field 222, respectively. Similar to the RDATA field 224, the RDATA field 322 may include an option-code field 324, an option-length field 326, and an option-data field 328.

Referring specifically now to FIG. 3B, shown are data that may be included within the option-code field 324, the option-length field 326, and the option-data field 328 in the pseudo resource record 310 of the DNS response 300, according to an example embodiment. Because the value of the option-code field 226 was "SECURITY_SCORE_CODE", the value of the option-code field 324 is also "SECURITY_SCORE_CODE". The option-length field 326 indicates a length of the option-data field 328 in bytes. For example, the option-length field 326 may be one, indicating that the option-data field 328 is one byte long. In one example, the four least significant bits of the option-data field 328 may be the DNS-Classification field 330, which may be used to indicate the classification of the requested domain name 114. For example, a value of zero may indicate that the requested domain name 114 is safe, a value of one may indicate that the requested domain name 114 is newly-seen, a value of two may indicate that the requested domain name 114 is suspicious, and a value of three may indicate that the requested domain name 114 is unsafe. While only four values are described, it should be appreciated that, because eight bits are available in the option-data field 328, values 0-255 may be used.

Figure 4:
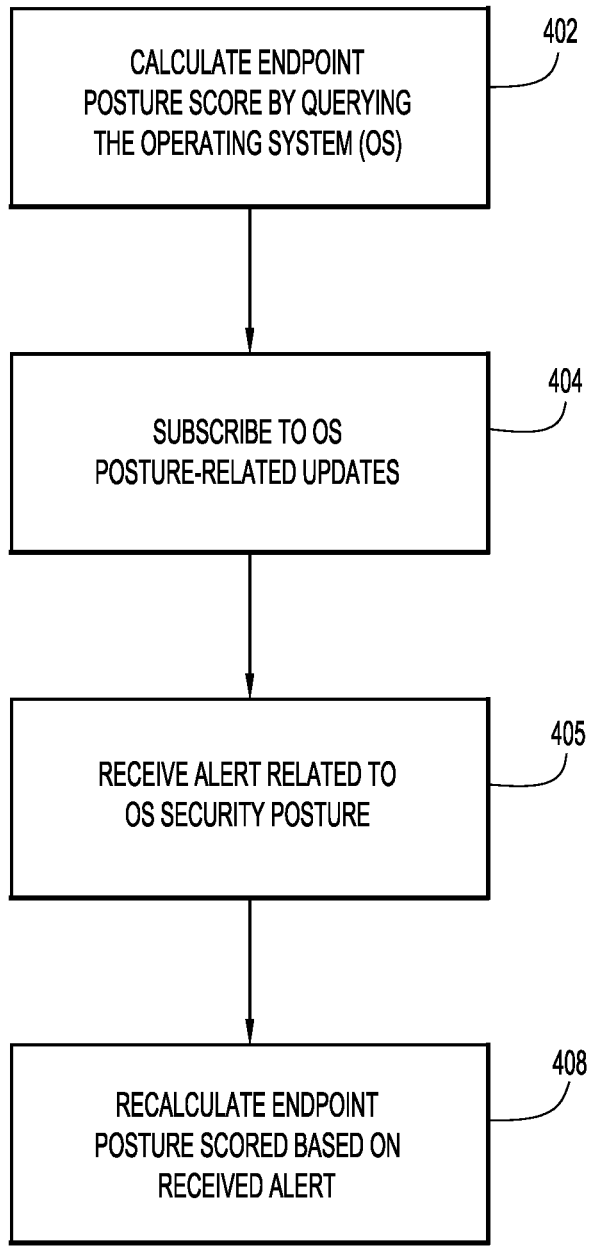
FIG. 4 is a flowchart depicting a method for computing an endpoint security posture score, according to an example embodiment.

Turning to FIG. 4, and with continuing reference to FIGS. 1-3B, shown is a flowchart depicting a method 400 for computing the endpoint posture score 234, according to an example embodiment. For example, the endpoint security scoring process logic 104 may compute the endpoint posture score 234. At operation 402, the endpoint security scoring process logic 104 may compute the endpoint posture score 234 by querying an operating system (OS) of the requesting endpoint 102(1). For example, the endpoint security scoring process logic 104 may obtain information regarding software vulnerabilities or when software on the requesting endpoint 102(1) was last updated. For example, the endpoint security scoring process logic 104 may compute the endpoint posture score 234 based on whether antivirus software is installed, whether the antivirus software is running, whether the antivirus software definitions are up to date, whether the most recent OS patches have been installed, whether the application that originated the DNS request is up to date, etc. Based on such information, the endpoint security scoring process logic 104 may determine the endpoint posture score 234. For example, the endpoint posture score 234 may range from zero to three, with zero representing the best security posture and three the poorest security posture. It should be appreciated that since there are four bits available to represent the endpoint posture score 234, the endpoint posture score 234 may range from zero to fifteen.

At operation 404, the endpoint security scoring process logic 104 may subscribe to OS security posture-related updates. For example, the OS security posture-related updates may include a change to the antivirus software, such as installing antivirus software on the requesting endpoint 102(1), uninstalling antivirus software on the requesting endpoint 102(1), and/or updating antivirus software definitions on the requesting endpoint 102(1). Other OS security posture-related updates may include installing the latest security patch for the OS or installing a security patch for a vulnerable application.

At operation 406, the endpoint security scoring process logic 104 may obtain an alert related to the OS security posture. For example, the endpoint security scoring process logic 104 may obtain an alert when there is an OS posture-related update, such as when antivirus software definitions were updated or when a security patch for the OS was installed.

At operation 408, when the endpoint security scoring process logic 104 obtains the alert, the endpoint security process logic 104 re-computes the endpoint posture score 234 based on the obtained alert. For example, when antivirus software definitions on the requesting endpoint 102(1) are updated, the endpoint security scoring process logic 104 may re-compute the endpoint posture score 234 as a safer score than previously computed. In contrast, if the endpoint security scoring process logic 104 obtains an alert indicating that the OS has not been patched to the most recent update, then the endpoint security scoring process logic 104 may re-compute the endpoint posture score 234 as a less safer score than previously computed. In this manner, the endpoint posture score 234 may dynamically change as circumstances at the requesting endpoint 102(1) change.

Figure 5:
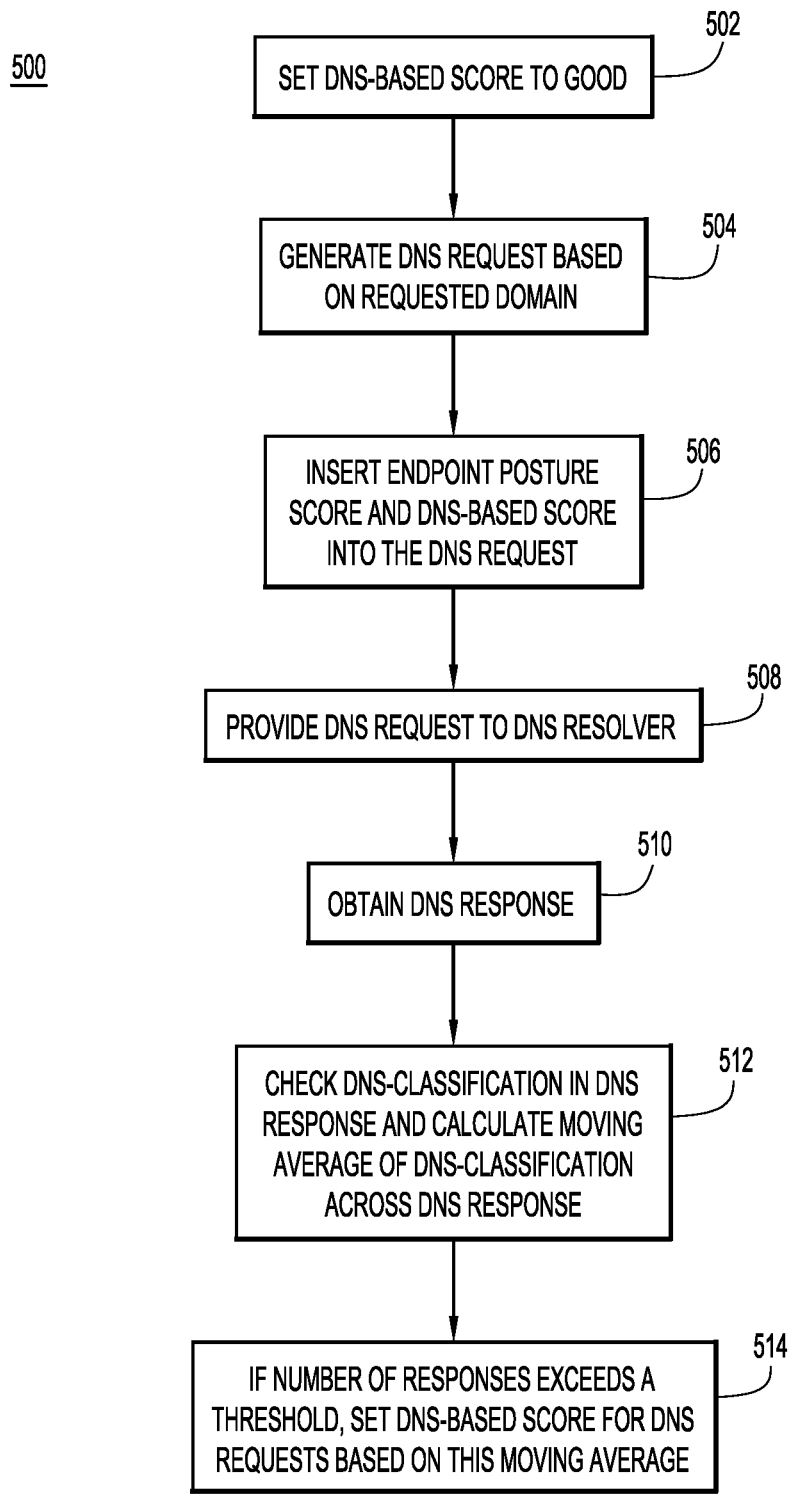
FIG. 5 is a flowchart depicting a method for computing a DNS-based score, according to an example embodiment.

Turning to FIG. 5, and with continuing reference to FIGS. 1-3B, shown is a flowchart depicting a method 500 for computing the DNS-based score 236, according to an example embodiment. For example, the endpoint security scoring process logic 104 may compute the DNS-based score 236.

At operation 502, the endpoint security scoring process logic 104 may initially set the DNS-based score 236 to a good, or safe, value. For example, when the DNS-based score 236 ranges from zero to three, with zero being the most secure, the endpoint security scoring process logic 104 may set the DNS-based score 236 to zero.

At operation 504, the requesting endpoint 102(1) may generate a DNS request based on the requested domain name 114. The DNS request may be in the form of DNS request 200, as described above.

At operation 506, the requesting endpoint 102(1) may insert the endpoint posture score 234 and the DNS-based score 236 into the DNS request 200. For example, the requesting endpoint 102(1) may insert the endpoint posture score 234 and the DNS-based score 236 into the option-data field 230, as described above in connection with FIG. 2B.

At operation 508, the requesting endpoint 102(1) may provide (send) the DNS request 200, including the endpoint posture score 234 and the DNS-based score 236, to the DNS resolver 110. The DNS resolver 110 may use the requested domain name 114, the endpoint posture score 234, and the DNS-based score 236 to resolve an IP address for the DNS request 200, as described in more detail herein. For example, based on the endpoint posture score 234 and the DNS-based score 236, the DNS resolver 110 may resolve the DNS request to an IP address of the first web server 112 hosting the requested domain name 114, the proxy server 116, or the second web server 118 hosting the blocked page 120. Additionally, the DNS resolver 110 may determine a classification of the requested domain name 114. The DNS resolver 110 may include the resolved IP address and the classification of the requested domain name 114 in a DNS response 300.

At operation 510, the requesting endpoint 102(1) may obtain (receive) the DNS response 300 from the DNS resolver 110. The DNS response 300 may include the IP address of the first web server 112 hosting the requested domain name 114, the proxy server 116, or the second web server 118 hosting the blocked page 120. The DNS response 300 may also include the DNS-Classification field 330 in the option-data field 328. As described above, the DNS-Classification field 330 may range from zero to three, with zero indicating a safe domain name, one indicating an unknown or newly seen domain name, two indicating a suspicious domain name, and three indicating a malicious domain name.

At operation 512, the endpoint security scoring process logic 104 may examine the DNS-Classification field 330 in the DNS response 300 to calculate a moving average of the DNS-Classification field 330 values. For example, the endpoint security scoring process logic 104 may compute an average of the DNS-Classification field 330 values over a predetermined number of DNS responses 300. In another example, the endpoint security scoring process logic 104 may compute the average of the DNS-Classification field 330 values over all DNS responses received.

At operation 514, the endpoint security scoring process logic 104 may compute the DNS-based score 236 based on the moving average of the DNS-Classification field 330 values.

Like the endpoint posture score 234, the DNS-based score 236 may range from zero to three, with zero being the safest DNS-based score 236 and three being the least safe DNS-based score 236. Also like the endpoint posture score 234, the DNS-based score 236 may range from zero to fifteen as there are four bits available to represent the DNS-based score 236. In this manner, the DNS-based score 236 may dynamically update as conditions at the requesting endpoint 102(1) change over time.

In one aspect of this disclosure, the requesting endpoint 102(1) may request a newly seen domain name in the DNS request 200. A newly seen domain name may be a domain name that the DNS resolver 110 has insufficient security information, or security intelligence, to classify the newly seen domain name. For example, domain generation algorithms (DGAs) may create newly seen domain names in bulk. An endpoint that is accessing a large number of newly seen domain names may result in the DNS-based score 236 being recomputed as less safe because the probability of the endpoint 102(1) being infected by malicious software is high. The DNS-based score may be recomputed as being less safe because the DNS resolver 110 will mark the DNS-Classification field 330 as one in the DNS response 300.

Figure 6:
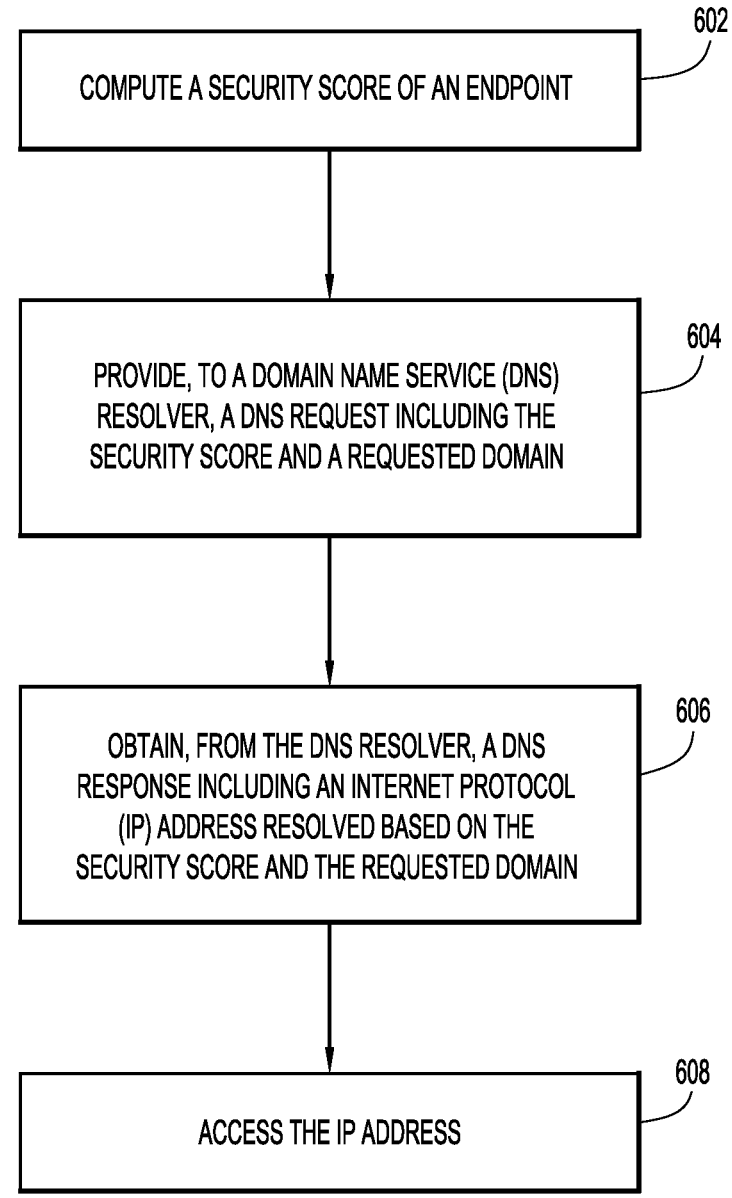
FIG. 6 is a flowchart depicting a method for resolving a DNS request based on an endpoint security score of a requesting endpoint, according to an example embodiment.

Turning to FIG. 6, and with continuing reference to FIGS. 1-5, shown is a flowchart depicting a method 600 for resolving a DNS request based on a security posture of a requesting endpoint, according to an example embodiment. The method 600 may be performed by one of the endpoints, such as requesting endpoint 102(1).

At operation 602, the endpoint security scoring process logic 104 may compute a security score 232 of the requesting endpoint 102(1). The security score 232 may include the endpoint posture score 234 and the DNS-based score 236. The endpoint posture score 234 may be based on security vulnerabilities of the endpoint 102(1), as described above in connection with FIG. 4. For example, the endpoint security scoring process logic 104 may compute the endpoint posture score 234 based on whether the OS has been updated to the most recent patch, whether the antivirus software is running, whether the antivirus software definitions are up to date, etc. The more up to date the software on the requesting endpoint 102(1) is, the more secure the endpoint posture score 234. The DNS-based score 236 may be based on a predetermined number, such as 100, previous DNS responses received from a DNS resolver, such as DNS resolver 110, as described above in connection with FIG. 5. The endpoint security scoring process logic 104 may compute a moving average of DNS-Classification field 330 values across DNS responses. The higher the moving average, the poorer the DNS-based score 236. In another aspect, the endpoint security scoring process logic 104 may also compute the DNS-based score 236 based on DNS responses that indicate a newly-seen domain name. The greater the number of DNS responses indicating a newly seen domain name, the higher the DNS-based score 236 may be.

At operation 604, the requesting endpoint 102(1) may provide, to the DNS resolver 110, a DNS request, such as DNS request 200, which includes the requested domain name 114 and the security score 232 computed in operation 602. For example, the requesting endpoint 102(1) may include the requested domain name 114 in the DNS request 200 and include the security score 232 in a pseudo resource record, such as pseudo resource record 206. As described above, the pseudo resource record 206 may have a one byte long option-data field 230. Therefore, four bits of the option-data field 230 may indicate the endpoint posture score 234 while the second four bits may indicate the DNS-based score 236.

At operation 606, the requesting endpoint 102(1) may obtain from the DNS resolver 110 a DNS response, such as DNS response 300. The DNS response 300 may include an IP address the DNS resolver 110 resolved for the DNS request 200 based on the security score 232 and the requested domain name 114. For example, the DNS resolver 110 may resolve the request to the IP address corresponding to the first web server 112 hosting the requested domain name 114, the IP address of a second web server 118 hosting the blocked page 120, or the IP address of a proxy server 114. The DNS resolver 110 may resolve to one of these IP addresses based on the security score 232 of the requesting endpoint 102(1) and the classification of the requested domain name 114.

At operation 608, the requesting endpoint 102(1) may access the IP address obtained from the DNS resolver 110.

Figure 7:
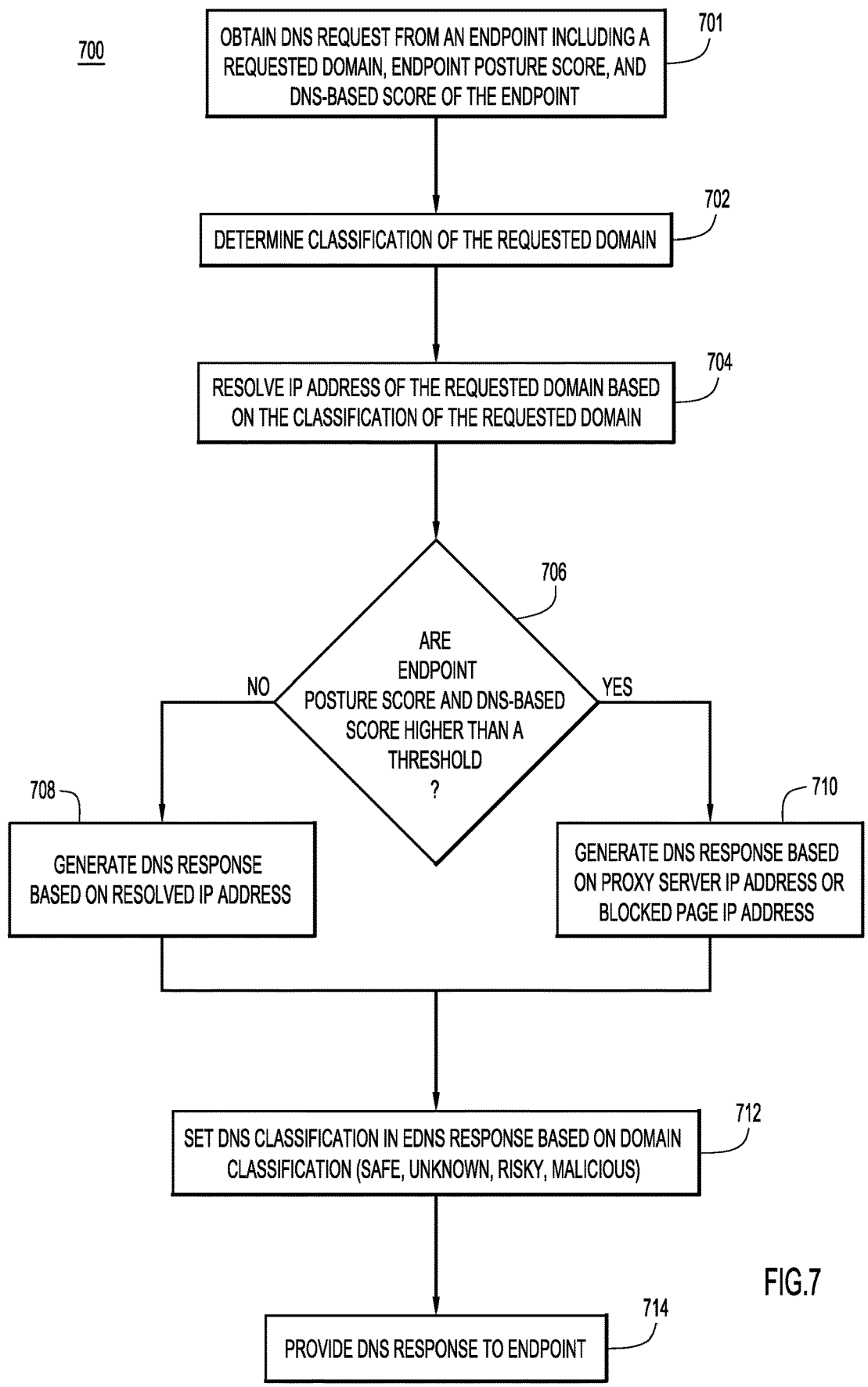
FIG. 7 is a flowchart depicting a method performed by a DNS resolver to resolve a DNS request including an endpoint security score, according to an example embodiment.

Turning to FIG. 7, and with continuing reference to FIGS. 1-6, shown is a flowchart depicting a method 700 for resolving a DNS request based on a security posture of a requesting endpoint, according to an example embodiment. The method 700 may be performed by the DNS resolver 110.

At operation 702, the DNS resolver 110 may obtain from a requesting endpoint, such as requesting endpoint 102(1), a DNS request, such as DNS request 200. The DNS request 200 may include a requested domain name 114, an endpoint posture score 234, and a DNS-based score 236 of the requesting endpoint 102(1). The endpoint posture score 234 and the DNS-based score 236 may be computed at the requesting endpoint 102(1) as described above in connection with FIGS. 4-5.

At operation 704, the DNS resolver 110 may determine a classification for the requested domain name 114 in the DNS request 200. For example, as described above, the DNS resolver 110 may have a classification for a variety of domain names. Based on the requested domain name 14, the DNS resolver 110 determines the classification for the requested domain name 114.

At operation 706, the DNS resolver 110 resolves the IP address of the requested domain name 114 based on the classification for the requested domain name 114. The IP address resolved in this operation is resolved without evaluating the endpoint posture score 234 or the DNS-based score 236.

At operation 708, the DNS resolver 110 may determine whether the endpoint posture score 234 and the DNS-based score 236 are safer than a predetermined threshold. For example, if the endpoint posture score 234 and the DNS-based score 236 range from zero to three, the DNS resolver 110 may determine whether the endpoint posture score 234 and the DNS-based score 236 are lower than one. If so, the DNS resolver 110 may determine that the requesting endpoint 102(1) is a sufficiently secure endpoint. If so, the method 700 proceeds to operation 710. However, if either the endpoint posture score 234 or the DNS-based score 236 is higher than the predetermined threshold, the DNS resolver 110 may determine that the requesting endpoint 102(1) is not a sufficiently secure endpoint. If so, the method 700 proceeds to operation 712.

At operation 710, the DNS resolver 110 generates a DNS response 300 based on the IP address that was resolved in operation 706 because the requesting endpoint 102(1) was determined to be sufficiently secure at operation 708. In other words, the DNS resolver 110 does not modify the resolved IP address to provide additional security protection to the requesting endpoint 102(1).

At operation 712, the DNS resolver 110 generates a DNS response 300 based on either the IP address of the proxy server 116 or the IP address of the second web server 118 hosting the blocked page 120 because the DNS resolver 110 determined that the requesting endpoint 102(1) is not sufficiently secure at operation 708. If the endpoint posture score 234 and the DNS-based score 236 indicate an average security posture for the requesting endpoint 102(1), then the DNS resolver 110 may include the IP address of the proxy server 116. However, if the endpoint posture score 234 and the DNS-based score 236 indicate a sufficiently unsafe requesting endpoint 102(1), then the DNS resolver 110 may include the IP address of the second web server 118 hosting the security blocked page 120. For example, when the endpoint posture score 234 and the DNS-based score are both three, the DNS resolver 110 may generate a DNS response 300 that includes the IP address of the second web server 118 hosting the blocked page 120. In other words, because the requesting endpoint 102(1) is not sufficiently secure, the DNS resolver 110 may modify the IP address resolved in operation 706 to provide additional security protection to the requesting endpoint 102(1).

At operation 714, the DNS resolver 110 sets the DNS-Classification field 330 of the DNS response 300 based on the classification of the requested domain name 114. For example, when the DNS resolver 110 has classified the requested domain name 114 as safe, the DNS resolver 110 may set the DNS-Classification field 330 to zero. When the DNS resolver 110 has classified the requested domain name 114 as a newly seen domain name, the DNS resolver 110 may set the DNS-Classification field 330 to one. When the DNS resolver 110 has classified the requested domain name 114 as suspicious, the DNS resolver 110 may set the DNS-Classification field 330 to two. When the DNS resolver 110 has classified the requested domain name 114 as unsafe, the DNS resolver 110 may set the DNS-Classification field 330 to three. The DNS-Classification field 330 may be used by the endpoint security scoring process logic 104 to compute the DNS-based score 236, as described above in FIG. 5.

At operation 716, the DNS resolver 110 may provide the DNS response 300 to the requesting endpoint 102(1).

Turning to FIG. 8, and with continuing reference to FIGS. 1-7, shown is a table 800 depicting domain name IP address resolutions based on a domain name classification and an endpoint security score, according to an example embodiment. The table 800 includes a column 802 of domain classifications, a column 804 of domain name IP address resolution without evaluating the endpoint security score, a column 806 of domain name IP address resolution when the endpoint security score for the requesting endpoint is safe (e.g., the endpoint security score is zero), a column 808 of domain name IP address resolution when the endpoint security score for the requesting endpoint is average (e.g., the endpoint security score is a one or two), a column 810 of domain name IP address resolution when the endpoint security score for the requesting endpoint is poor (e.g., the endpoint security score is three), and a column 812 indicating a value for the DNS-Classification field for each respective domain classification.

Column 802 includes four domain name classifications: safe, unknown/newly seen, suspicious, and unsafe. The domain name classifications may be based on prior knowledge or intelligence about the requested domain name 114. Additionally, the DNS resolver 110 may update the domain name classification for the requested domain name 114 based on the security score 232 of requesting endpoint 102(1), as will be described in more detail herein.

Column 804 indicates to which IP address the DNS resolver 110 resolves the DNS request without evaluating the security score 232 of the requesting endpoint 102(1), such as at operation 706 in FIG. 7. As shown, when the requested domain name 114 has been classified as safe or newly seen, the DNS resolver 110 may resolve the domain name to the IP address of the first web server 112 hosting the requested domain name 114. When the requested domain name 114 has been classified as suspicious, the DNS resolver 110 may resolve the domain name to the IP address of the proxy server 116. When the requested domain name 114 has been classified as unsafe, the DNS resolver 110 may resolve the domain name to the IP address of the second web server 118 hosting the blocked page 120.

Columns 806, 808, and 810 indicate the IP address the DNS resolver 110 returns to the requesting endpoint 102(1) in the DNS response 300 when evaluating the security score 232 of the requesting endpoint 102(1). Depending on the security score 232 of the requesting endpoint 102(1), the DNS resolver 110 may change the IP address indicated in column 804. For example, in column 806, when the security score 232 of the requesting endpoint 102(1) is safe and the classification of the requested domain name 114 is unsafe, the DNS resolver 110 may resolve the DNS request 200 to the IP address of the second web server 118 hosting the blocked page 120. However, given the same security posture for the requesting endpoint 102(1) but with a classification of the requested domain name 114 as safe or newly seen, the DNS resolver 110 may resolve the DNS request 200 to the IP address of the first web server 112 hosting the requested domain name 114. However, when it is determined that the requested domain name 114 is neither safe nor unsafe, i.e., the requested domain name 114 is suspicious, the DNS resolver 110 may resolve the requested domain name 114 to an IP address of the proxy server 116.

In column 808, when the security score 232 of the requesting endpoint 102(1) is average, i.e., the security score 232 for the requesting endpoint 102(1) is a one or a two, and the requested domain name 114 is classified as unsafe or suspicious, the DNS resolver 110 may resolve the requested domain name 114 to the IP address of the second web server 118 hosting the blocked page 120. When the requested domain name 114 is classified as safe or newly seen, the DNS resolver 110 may resolve the requested domain name 114 to the IP address of the proxy server 116.

In column 810, when the security score 232 of the requesting endpoint 102(1) is poor, i.e., the security score 232 for the requesting endpoint 102(1) is three, and the domain name 114 is classified as newly seen, suspicious, or unsafe, the DNS resolver 110 may resolve the requested domain name 114 to the IP address of the second web server 118 hosting the blocked page 120. When the domain name 114 is classified as safe, the DNS resolver 110 may resolve the requested domain name 114 to the IP address of the proxy server 116.

Column 812 indicates a value the DNS resolver 110 includes in the DNS-Classification field 330. The DNS resolver 110 will set the DNS-Classification field 330 in the DNS response 300 based on the domain classification without taking into account the security score 232 of the requesting endpoint 102(1). For example, when the requested domain name 114 is classified as safe, the DNS resolver 110 may set the value for the DNS-Classification field 330 to zero. When the requested domain name 114 is classified as newly seen, the DNS resolver 110 may set the value for the DNS-Classification field 330 to one. When the requested domain name 114 is classified as suspicious, the DNS resolver 110 may set the value for the DNS-Classification field 330 to two. When the requested domain name 114 is classified as unsafe, the DNS resolver 110 may set the value for the DNS-Classification field 330 to three. As described above in FIG. 5, the endpoint security scoring process logic 104 of the requesting endpoint 102(1) may use the value in the DNS-Classification field 330 to compute the DNS-based score 236.

Figure 9:
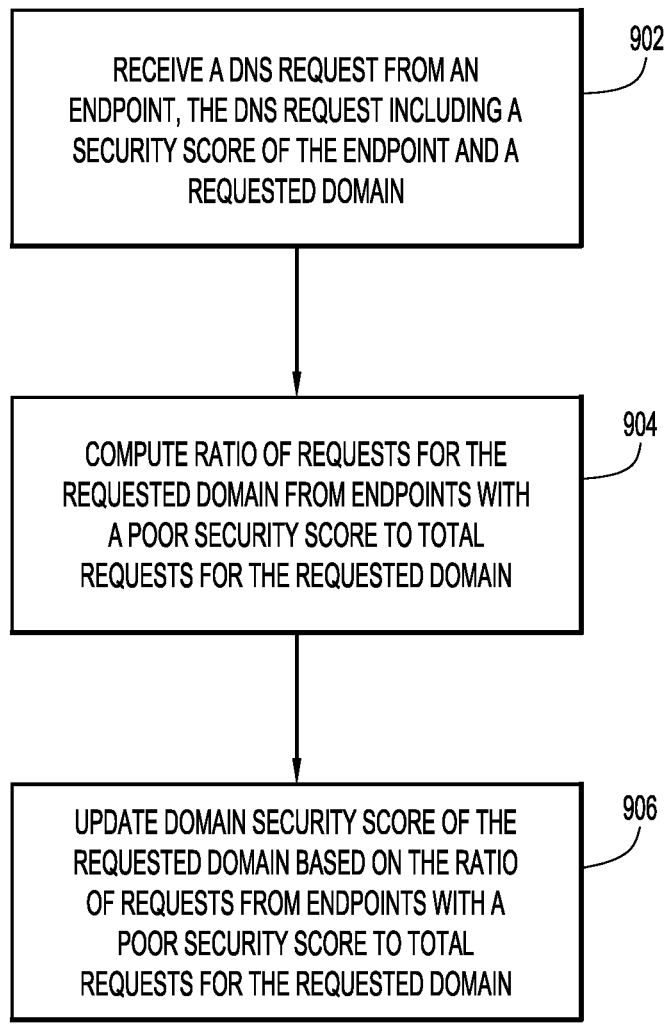
FIG. 9 is a flowchart depicting a method for reclassifying a requested domain name, according to an example embodiment.

Turning to FIG. 9, and with continuing reference to FIGS. 1-5, shown is a flowchart depicting a method 900 for reclassifying the requested domain name 114, according to an example embodiment. The method 900 may be performed by the DNS resolver 110, for example.

At operation 902, the DNS resolver 110 may receive the DNS request 200 from the requesting endpoint 102(1). The DNS request 200 may include the security score 232 of the requesting endpoint 102(1) as well as the requested domain name 114. As described above, the security score 232 of the requesting endpoint 102(1) may include the endpoint posture score 234 and the DNS-based score 236.

At operation 904, the DNS resolver 110 may compute a ratio of requests for the requested domain name 114 from endpoints that have a low security score 232 to total requests for the requested domain name 114. This ratio may be indicative of the classification of the requested domain name 114.

At operation 906, the DNS resolver 110 may update the classification of the requested domain name 114 based on the ratio computed at operation 904. For example, when the ratio is higher than a predetermined threshold, then the DNS resolver 110 may reclassify the requested domain name 114 as being less secure. For example, if the requested domain name 114 was previously classified as safe but the ratio increased above the predetermined threshold, then the DNS resolver 110 may reclassify the requested domain name 114 as suspicious.

Figure 10:
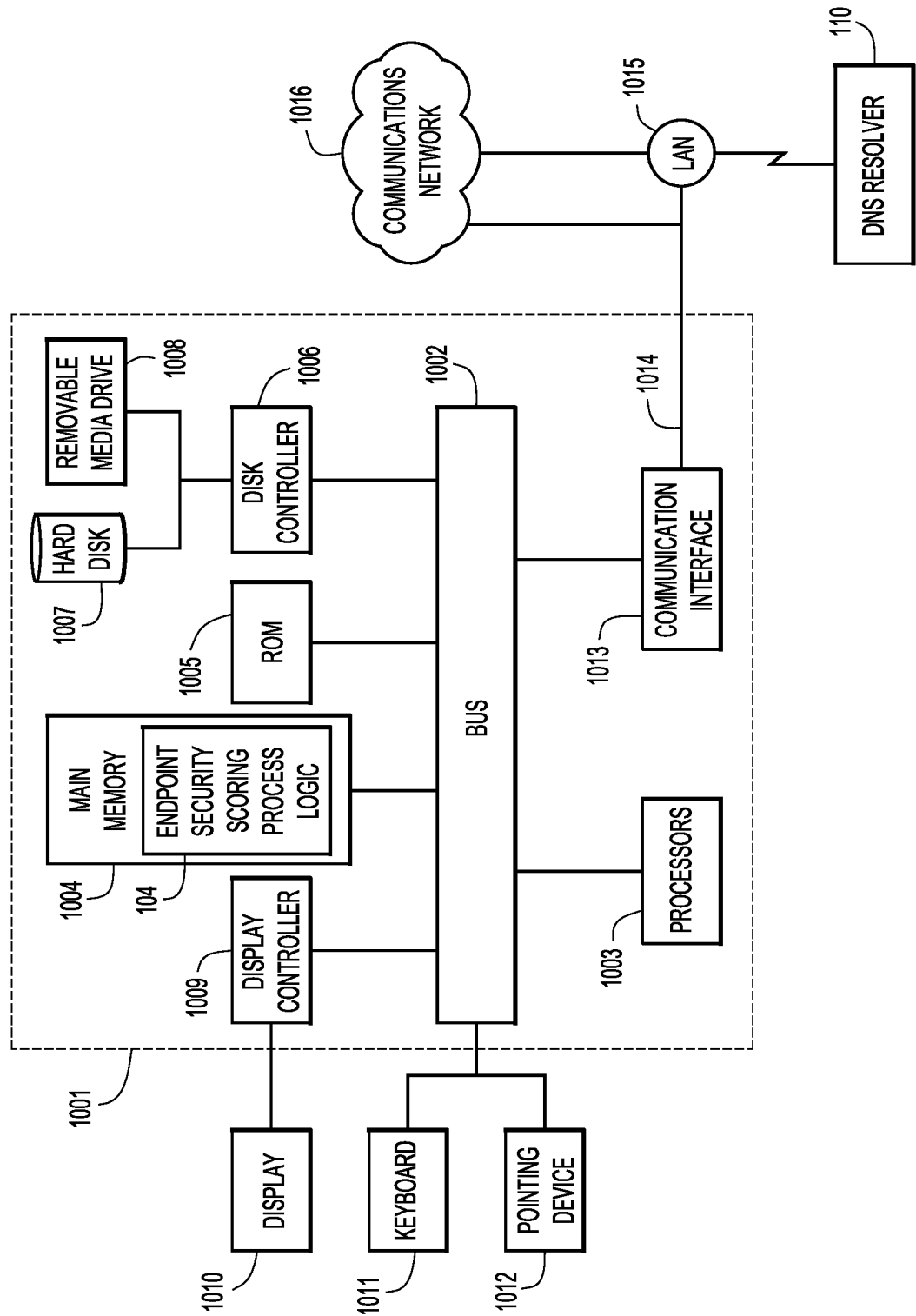
FIG. 10 is a block diagram of an endpoint configured to use endpoint security scoring logic to protect the endpoint, according to an example embodiment.

FIG. 10 is a block diagram showing a network endpoint, e.g., network endpoint 102(1) shown in FIG. 1, configured to use endpoint security scoring logic 104 to protect an endpoint, according to example embodiments described herein. FIG. 10 shows that the network endpoint 102(1) may take the form of a computer system 1001 or computer device. The computer system 1001 includes a bus 1002 or other communication mechanism for communicating information, and a processor 1003 coupled with the bus 1002 for processing the information. While the figure shows a single block 1003 for a processor (e.g., microprocessor or microcontroller), it should be understood that the processors 1003 represent a plurality of processing cores, each of which can perform separate processing. The computer system 1001 also includes a main memory 1004, such as a random access memory (RAM) or other dynamic storage device (e.g., dynamic RAM (DRAM), static RAM (SRAM), and synchronous DRAM (SD RAM)), coupled to the bus 1002 for storing information and instructions to be executed by processor 1003. In addition, the main memory 1004 may be used for storing temporary variables or other intermediate information during the execution of instructions by the processor 1003.

The computer system 1001 further includes a read only memory (ROM) 1005 or other static storage device (e.g., programmable ROM (PROM), erasable PROM (EPROM), and electrically erasable PROM (EEPROM)) coupled to the bus 802 for storing static information and instructions for the processor 1003.

The computer system 1001 may include a disk controller 1006 coupled to the bus 1002 to control one or more storage devices for storing information and instructions, such as a magnetic hard disk 1007, and a removable media drive 1008 (e.g., floppy disk drive, read-only compact disc drive, flash drive, read/write compact disc drive, and removable magneto-optical drive). The storage devices may be added to the computer system 801 using an appropriate device interface (e.g., small computer system interface (SCSI), integrated device electronics (IDE), enhanced-IDE (E-IDE), direct memory access (DMA), or ultra-DMA).

The computer system 1001 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1001 may also include a display controller 1009 coupled to the bus 1002 to control a display 1010, such as a cathode ray tube (CRT), for displaying information to a computer user. The computer system 1001 includes input devices, such as a keyboard 1011 and a pointing device 1012, for interacting with a computer user and providing information to the processor 1003. The pointing device 1012, for example, may be a mouse, a trackball, or a pointing stick for communicating direction information and command selections to the processor 1003 and for controlling cursor movement on the display 1010.

The computer system 1001 performs a portion or all of the processing steps of the process in response to the processor 1003 executing one or more sequences of one or more instructions contained in a memory, such as the main memory 1004. Such instructions may be read into the main memory 1004 from another computer readable medium, such as a hard disk 1007 or a removable media drive 1008. One or more processors in a multi-processing arrangement may also be employed to execute the sequences of instructions contained in main memory 1004. In alternative embodiments, hard-wired circuitry may be used in place of or in combination with software instructions. Thus, embodiments are not limited to any specific combination of hardware circuitry and software.

As stated above, the computer system 1001 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, Stored on any one or on a combination of non-transitory computer readable storage media, embodiments presented herein include software for controlling the computer system 1001, for driving a device or devices for implementing the process, and for enabling the computer system 1001 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1001 also includes a communication interface 1013 coupled to the bus 1002. The communication interface 1013 provides a two-way data communication coupling to a network link 1014 that is connected to, for example, a local area network (LAN) 1015, or to another communications network 1016 such as the Internet and ultimately to connect to a DNS resolver point shown generically at 110 in FIG. 10. For example, the communication interface 1013 may be a wired or wireless network interface card having a plurality of ports configured to connect to any packet switched (wired or wireless) LAN. As another example, the communication interface 1013 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1013 sends and receives electrical, electromagnetic or optical signals that carry digital data streams representing various types of information.

The network link 1014 typically provides data communication through one or more networks to other data devices. For example, the network link 1014 may provide a connection to another computer through a local area network 1015 (e.g., a LAN) or through equipment operated by a service provider, which provides communication services through a communications network 1016. The local network 1014 and the communications network 1016 use, for example, electrical, electromagnetic, or optical signals that carry digital data streams, and the associated physical layer (e.g., CAT 5 cable, coaxial cable, optical fiber, etc.). The signals through the various networks and the signals on the network link 1014 and through the communication interface 1013, which carry the digital data to and from the computer system 1001 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The computer system 1001 can transmit and receive data, including program code, through the network(s) 1015 and 1016, the network link 1014 and the communication interface 1013. Moreover, the network link 1014 may provide a connection through a LAN 1015 to a DNS resolver 110 such as a server.

In summary, a method for enforcing DNS security policies is disclosed at an endpoint connected to a network is disclosed. The method includes computing a security score of the endpoint; providing, to a domain name service (DNS) resolver, a DNS request including the security score and a requested domain name; obtaining, from the DNS resolver, a DNS response including an Internet Protocol (IP) address resolved based on the security score and the requested domain name; and accessing the IP address.

More specifically, the security score includes an endpoint security posture score representing security risk associated with software executing on the endpoint and an endpoint DNS-based score representing security risk associated with DNS responses obtained from the DNS resolver.

In another embodiment, the method may also include computing the endpoint security posture score based on security parameters of software executing on the endpoint; and computing the endpoint DNS-based score based on a predetermined number of previous DNS responses obtained from the DNS resolver.

Moreover, the requested domain name has a domain name security score that is updated based on the security score of DNS requests received from the endpoint.

In another aspect, the IP address resolved based on the security score and the requested domain name is further based on the domain name security score. Under these circumstances the IP address is resolved to one of an IP address corresponding to the requested domain name, an IP address corresponding to a proxy server, or an IP address corresponding to a blocked page.

The method may also include recomputing the security score of the endpoint to indicate that the endpoint is less secure when the endpoint has provided a predetermined number of DNS requests for a newly seen domain name. The newly seen domain name is a domain name about which the DNS resolver has insufficient security information to compute a domain name security score for the newly seen domain name.

In another embodiment, an apparatus including a communication interface configured to enable network communications and a processing device coupled with the communication interface is disclosed. The processor is configured to compute a security score of the endpoint; provide, to a domain name service (DNS) resolver, a DNS request including the security score and a requested domain name; obtain, from the DNS resolver, a DNS response including an Internet Protocol (IP) address resolved based on the security score and the requested domain name; and access the IP address.

In yet another embodiment, one or more non-transitory computer readable storage media encoded with instructions is disclosed. When the instructions are executed by a processor, the processor computes a security score of the endpoint; provides, to a domain name service (DNS) resolver, a DNS request including the security score and a requested domain name; obtains, from the DNS resolver, a DNS response including an Internet Protocol (IP) address resolved based on the security score and the requested domain name; and accesses the IP address.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer implemented method using one or more hardware processors, the method comprising:
   at an endpoint connected to a network:
   responsive to sending domain name system (DNS) requests to a DNS resolver, receiving, from the DNS resolver, DNS responses that resolve a requested domain name to Internet Protocol (IP) addresses and include classification values for the requested domain name ranging in value to indicate safe to unsafe domains;
   computing an average of the classification values based on a predetermined number of the DNS responses obtained from the DNS resolver as an endpoint DNS-based score that represents security risk from safe to unsafe for the DNS responses;
   computing an endpoint security posture score based on security parameters of software executing on the endpoint;
   computing a security score of the endpoint, the security score including the endpoint security posture score to represent security risk associated with the software executing on the endpoint and the endpoint DNS-based score;
   providing, to the DNS resolver, a DNS request including the endpoint security posture score and the endpoint DNS-based score of the security score, and the requested domain name to be resolved by the DNS resolver;
   obtaining, from the DNS resolver, a DNS response including an IP address resolved to an IP address of the requested domain name, an IP address of a proxy server, or an IP address of a blocked page based on the endpoint security posture score, the endpoint DNS-based score, and the requested domain name; and
by the one or more hardware processors, accessing the IP address.

2. The computer implemented method of claim 1, further comprising:
when the endpoint security posture score and the endpoint DNS-based score are higher than a threshold that indicates the endpoint is secure, the DNS response includes the IP address resolved to the IP address of the requested domain name; and
when the endpoint security posture score and the endpoint DNS-based score are not higher than the threshold, the DNS response includes the IP address resolved to the IP address of the proxy server or the IP address of the blocked page.

3. The computer implemented method of claim 2, wherein the endpoint security posture score ranges in value to indicate a best security posture to a poorest security posture.

4. The computer implemented method of claim 1, wherein the classification values range from zero to three, with zero indicating a safe domain name, one indicating an unknown or newly seen domain name, two indicating a suspicious domain name, and three indicating a malicious domain name.

5. The computer implemented method of claim 1, wherein the requested domain name has a domain name security score that is updated based on security scores of DNS requests received from the endpoint.

6. The computer implemented method of claim 1, further comprising:
when the endpoint has provided a predetermined number of DNS requests for a newly seen domain name, recomputing the security score of the endpoint to indicate that the endpoint is less secure.

7. The computer implemented method of claim 6, wherein the newly seen domain name is a domain name about which the DNS resolver has insufficient security information to compute a domain name security score for the newly seen domain name.

8. An apparatus comprising:
a communication interface configured to enable network communications; and
a processing device of an endpoint coupled with the communication interface, and configured to:
responsive to sending domain name system (DNS) requests to a DNS resolver, receive, from the DNS resolver, DNS responses that resolve a requested domain name to Internet Protocol (IP) addresses and include classification values for the requested domain name ranging in value to indicate safe to unsafe domains;
compute an average of the classification values based on a predetermined number of the DNS responses obtained from the DNS resolver as an endpoint DNS-based score that represents security risk from safe to unsafe for the DNS responses;
compute an endpoint security posture score based on security parameters of software executing on the endpoint;
compute a security score of the endpoint, the security score including the endpoint security posture score to represent security risk associated with the software executing on the endpoint and the endpoint DNS-based score;
provide, to the DNS resolver, a DNS request including the endpoint security posture score and the endpoint DNS-based score of the security score, and the requested domain name to be resolved by the DNS resolver;
obtain, from the DNS resolver, a DNS response including an IP address resolved to an IP address of the requested domain name, an IP address of a proxy server, or an IP address of a blocked page based on the endpoint security posture score, the endpoint DNS-based score, and the requested domain name; and
access the IP address.

9. The apparatus of claim 8, further comprising:
when the endpoint security posture score and the endpoint DNS-based score are higher than a threshold that indicates the endpoint is secure, the DNS response includes the IP address resolved to the IP address of the requested domain name; and
when the endpoint security posture score and the endpoint DNS-based score are not higher than the threshold, the DNS response includes the IP address resolved to the IP address of the proxy server or the IP address of the blocked page.

10. The apparatus of claim 9, wherein the endpoint security posture score ranges in value to indicate a best security posture to a poorest security posture.

11. The apparatus of claim 8, wherein the requested domain name has a domain name security score that is updated based on security scores of DNS requests received from the endpoint.

12. The apparatus of claim 11, wherein the IP address is further resolved based on the domain name security score.

13. The apparatus of claim 8, wherein the processing device is further configured to:
when the endpoint has provided a predetermined number of DNS requests for a newly seen domain name, recompute the security score of the endpoint to indicate the endpoint is less secure.

14. The apparatus of claim 13, wherein the newly seen domain name is a domain name about which the DNS resolver has insufficient security information to compute a domain name security score for the newly seen domain name.

15. One or more non-transitory computer readable storage media encoded with instructions that, when executed by a processor of an endpoint, cause the processor to:
responsive to sending domain name system (DNS) requests to a DNS resolver, receive, from the DNS resolver, DNS responses that resolve a requested domain name to Internet Protocol (IP) addresses and include classification values for the requested domain name ranging in value to indicate safe to unsafe domains;
compute an average of the classification values based on a predetermined number of the DNS responses obtained from the DNS resolver as an endpoint DNS-based score that represents security risk from safe to unsafe for the DNS responses;
compute an endpoint security posture score based on security parameters of software executing on the endpoint;
compute a security score of the endpoint, the security score including the endpoint security posture score to represent security risk associated with the software executing on the endpoint and the endpoint DNS-based score;
provide, to the DNS resolver, a DNS request including the endpoint security posture score and the endpoint DNS-based score of the security score, and the requested domain name to be resolved by the DNS resolver;

obtain, from the DNS resolver, a DNS response including an IP address resolved to an IP address of the requested domain name, an IP address of a proxy server, or an IP address of a blocked page based on the endpoint security posture score, the endpoint DNS-based score, and the requested domain name; and access the IP address.

16. The one or more non-transitory computer readable storage media of claim 15, further comprising:

when the endpoint security posture score and the endpoint DNS-based score are higher than a threshold that indicates the endpoint is secure, the DNS response includes the IP address resolved to the IP address of the requested domain name; and when the endpoint security posture score and the endpoint DNS-based score are not higher than the threshold, the DNS response includes the IP address resolved to the IP address of the proxy server or the IP address of the blocked page.

17. The one or more non-transitory computer readable storage media of claim 16, wherein the endpoint security posture score ranges in value to indicate a best security posture to a poorest security posture.

18. The one or more non-transitory computer readable storage media of claim 15, wherein the requested domain name has a domain name security score that is updated based on security scores of DNS requests received from the endpoint.

19. The one or more non-transitory computer readable storage media of claim 18, wherein the IP address is further resolved based on the domain name security score.

20. The one or more non-transitory computer readable storage media of claim 15, wherein the instructions further cause the processor to:

when the endpoint has provided a predetermined number of DNS requests for a newly seen domain name, recompute the security score of the endpoint to indicate that the endpoint is less secure.

* * * * *